United States Patent [19]

James

[11] 4,349,273
[45] Sep. 14, 1982

[54] ELECTROPHOTOGRAPHIC PRINTER EXPOSURE STATION

[75] Inventor: Paul M. James, London, England
[73] Assignee: Imaging Technology Limited, London, England
[21] Appl. No.: 238,583
[22] Filed: Feb. 26, 1981
[30] Foreign Application Priority Data Mar. 5, 1980 [GB] United Kingdom ............... 8007497

[51] Int. Cl.³ .................... G03B 27/58; B65H 9/00
[52] U.S. Cl. ...................................... 355/72; 271/236
[58] Field of Search ................ 355/3 SH, 14 SH, 72, 355/51; 271/236, 245, 246

[56] References Cited

U.S. PATENT DOCUMENTS

| | | | |
|---|---|---|---|
| 3,630,606 | 12/1971 | Sage | 355/3 R |
| 3,899,248 | 8/1975 | Tiger | 355/45 X |
| 3,901,593 | 8/1975 | Kogiso | 355/11 |
| 3,908,986 | 9/1975 | Bleau | 271/236 X |
| 4,054,379 | 10/1977 | Sone et al. | 355/45 X |
| 4,073,391 | 2/1978 | O'Brien et al. | 271/246 X |
| 4,279,504 | 7/1981 | Brown et al. | 355/72 |

FOREIGN PATENT DOCUMENTS

| | | | |
|---|---|---|---|
| 494444 | 10/1938 | United Kingdom | 271/236 |
| 1408581 | 10/1975 | United Kingdom . | |
| 1451709 | 10/1976 | United Kingdom . | |

*Primary Examiner*—Richard A. Wintercorn
*Attorney, Agent, or Firm*—Dann, Dorfman, Herrell and Skillman

[57] ABSTRACT

An exposure station of an electrophotographic printer (e.g. a reader-printer) comprises means defining a downwardly inclined support for a copy sheet and stop means for the sheet adjacent to the lower extremity of the support, the stop means being movable between operative and inoperative positions, in the former of which it supports the copy sheet against sliding down the support. The stop means comprises a lower stop means and an upper stop means, the lower stop means being effective in a transverse central region of the support and the upper stop means being in two parts, one lying on each side of said central region.

7 Claims, 5 Drawing Figures

ELECTROPHOTOGRAPHIC PRINTER EXPOSURE STATION

This invention relates to an electrophotographic printer which has particular reference to microfilm reader-printers.

It is well known to produce a permanent copy of an image by the electrophotographic technique in which a uniformly charged photoconductive surface is illuminated with the image to produce variations of charge distribution on the surface, the surface then being contacted with toner particles which are preferentially attracted to the surface in dependence on the charge image formed thereon, a permanent copy being produced from the array of toner particles thereby formed on the photoconductive surface.

One method of operating the electrophotographic technique is to use a zinc oxide coating on a paper sheet as the photoconductive surface and to feed the coated paper along a copy sheet path sequentially through a charging station (in which a uniform charge distribution is formed on the coating), an exposure station (in which the charge image is formed) and a development station (in which the toner particles are applied to the coating.

Normally the coated paper sheets are positively conveyed from an inlet of the charging station to an outlet of the development station, and examples of reader-printers which employ such positive conveyance throughout the copy sheet path, are U.K. Patent Specification No. 1,408,581 and U.S. Pat. No. 4,054,379.

It has been proposed in U.K. Patent Specification No. 1,451,709 to combine the charging and exposure stations into a single station and to drop a sheet of copy material into this combined station and to allow the exposed sheet to drop from the combined station into an inlet of the development station.

This invention relates to a modified form of the arrangements described in the aforesaid specifications and relates to an electrophotographic printer in which a copy sheet is positively conveyed through initial and final parts of the copy sheet path through charging and development stations but is allowed to advance by gravity-induced fall into and out of the exposure station.

Using gravity-induced fall of a copy sheet in a part of the copy sheet path has been found to lead to a simplification in the printing equipment provided particularly in a microfilm reader-printer.

According to the present invention, an exposure station in an electrophotographic printer comprises means defining a downwardly inclined support for a copy sheet and stop means for the sheet adjacent to the lower extremity of the support, which stop means is movable between operative and inoperative positions only in the former of which it supports a sheet against sliding down the support, the stop means comprising a lower stop means and an upper stop means, the lower stop means being effective in a transverse central region of the support and the upper stop means being in two parts, one lying on each side of said central region.

There are basically two types of microfilm reader-printer which use an image recorded on microfilm as an input and project a magnified image of the film onto a screen for viewing by an observer. The first type, known as the "back projection" type, uses a translucent screen onto the rear surface of which the image is projected (the observer thus viewing by transmitted light). The second type, known as the "front projection" type, uses a screen illuminated from the said side as the observer, the observer thereby seeing the image via reflected light.

The invention is particularly applicable to a front projection reader-printer in which the screen is formed by a plane surface inclined at an angle suitable for viewing, in practice an angle to the horizontal of 45° plus 25° or minus 10°. It has been found that a copy sheet can be moved into the desired exposure position on the screen by feeding it from a charging station disposed above the screen and allowing the sheet to drop from exit rolls of the charging station into the desired exposure position on the screen.

Since conventional copy sheets are rectangular with ends which are shorter than the sides and it is sometimes more convenient to produce the image on the sheet with an end uppermost and on other occasions with a side uppermost, a printer in accordance with the invention is provided with an exposure station wide enough to receive the copy sheet with a side uppermost and has the two sets of stop means in the station, the lower stop means being effective if the copy sheet is fed in with an end thereof leading and the higher stop means being effective if the copy sheet is fed in with a side thereof leading. Arranging the stop means in this way ensures that the printer automatically arrests the gravity fall of the copy sheet at the correct position in the exposure station.

Suitably the means defining the support is a plane plate provided with apertures for the stop means, the stop means being members projecting through those apertures from below in the operative, but not in the inoperative, position.

Conveniently the projecting members are bent-up edge regions of a second plate movably mounted below the support which second plate is gravity-urged into its lower position and locked in its upper position by a spring-urged finger.

Desirably the spacing between the rest positions of the leading edge of a copy sheet when resting respectively on the lower and the upper stop means, is substantially one half the difference between the length and the width of the size of copy sheet for which the printer has been designed to operate. Suitably the two parts of the upper stop means are spaced apart by a distance which is slightly greater than the width of a copy sheet for which the printer has been designed to operate.

Since the path of a copy sheet through the exposure station is in the downward direction, it is desirable to locate a reservoir for copy sheets at the top of the printer and this reservoir can be coupled to the charging station by an automatic sheet feed or, in the case of a printer designed for only occasional use, for manual feed of sheets from the reservoir into the inlet end of the charging station.

To ensure that the copy sheet passes through the development station with its leading end normal to the direction of the movement of the sheet through the development station, it is desirable to provide an inlet nip for the development station which is defined between a pair of confronting rollers, to allow the copy sheet to drop against the upstream side of that nip when the stop means is withdrawn from the leading edge of the copy sheet after exposure has been effected in the exposure station, but to slightly delay the commencement of rotation of the confronting rollers by a time sufficient to ensure that the copy sheet has become stationary against the nip with its leading edge accurately aligned with the nip.

Suitably the inlet of the charging station comprises a pair of rollers defining a nip therebetween, one of the rollers of that pair being manually rotatable to permit at least initial manual feed of the copy sheet into the charging station.

The further description will relate to a reader-printer, but it should be appreciated that the invention is not limited to printers of this type.

One embodiment of reader-printer in accordance with the invention will now be described, by way of example, with reference to the accompanying drawings, in which.

Figure 1:
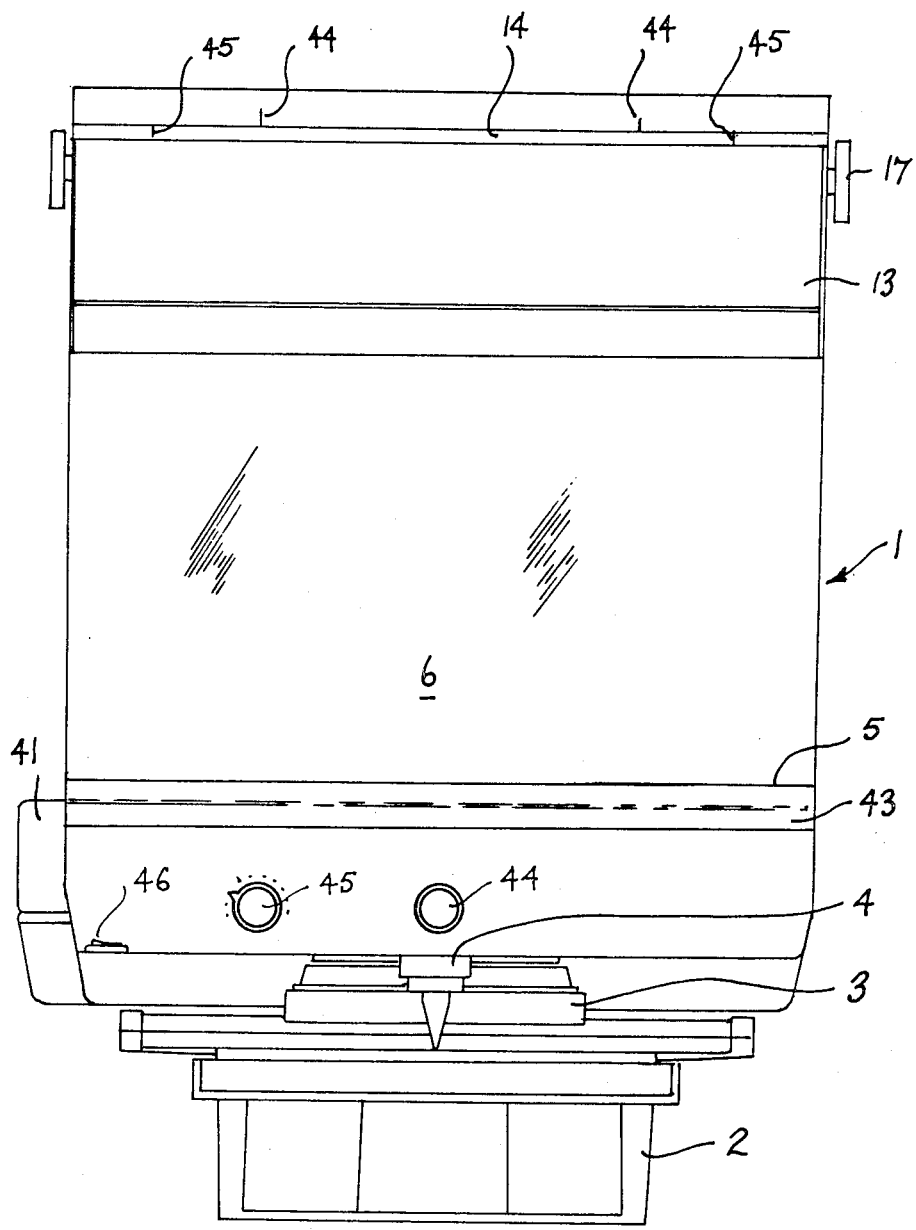
FIG. 1 is a front view of the reader-printer.
Figure 2:
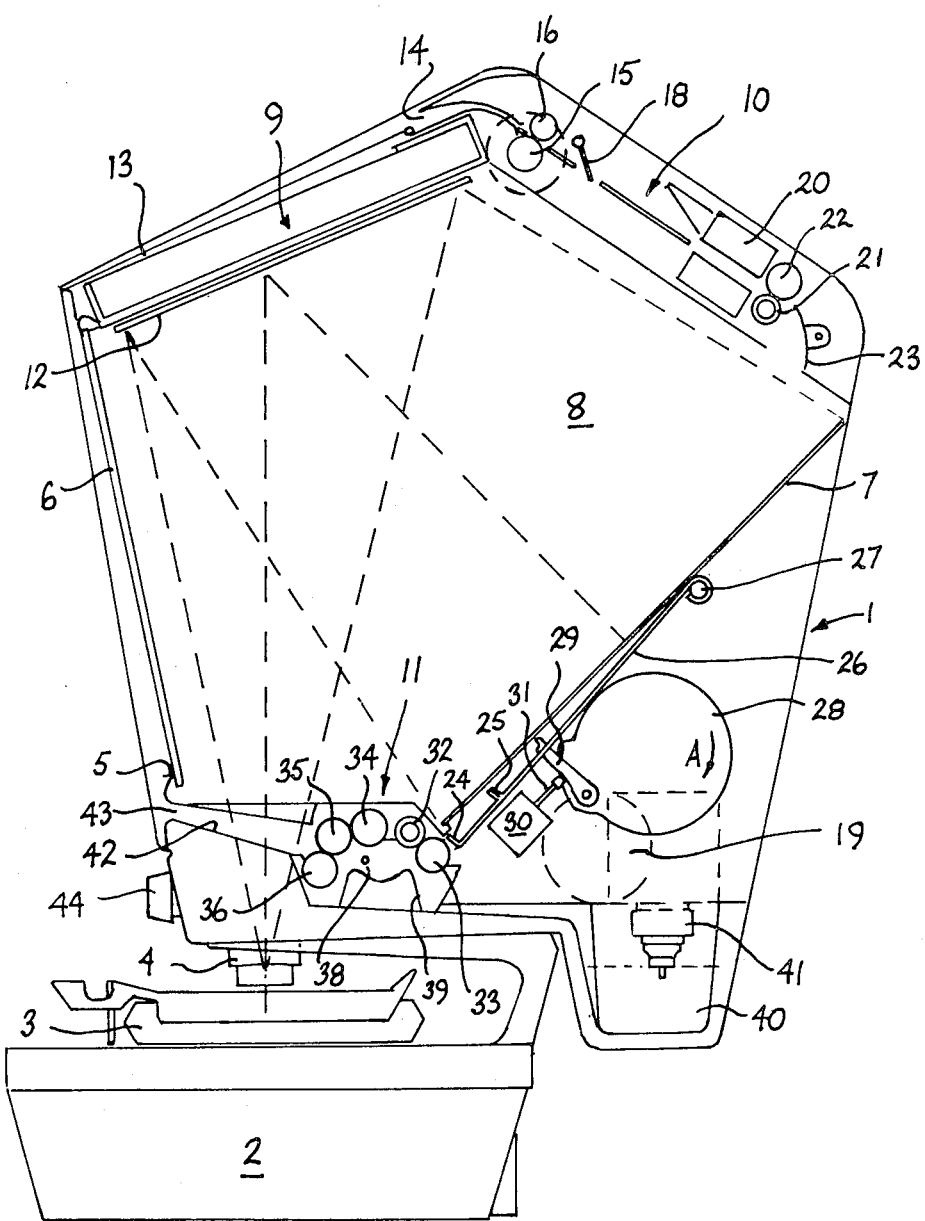
FIG. 2 is a schematic sectional view on the line II—II through FIG. 1.

Referring first to FIGS. 1 and 2 the device illustrated comprises a housing generally designated 1 which is mounted on a lamp box 2. Between the housing 1 and the lamp box 2 a conventional microfiche carrier 3 is located, this carrier being movable in conventional manner to locate any one of the images on a microfiche mounted in the carrier, over the optical axis of a light beam projected up from the box 2 into the housing 1 through a lens system 4. The lamp box 2, carrier 3 and lens system 4 are of conventional design and will not be further described.

The front face of the housing 1 consists essentially of a viewing window 5 which is covered with a sheet of transparent coloured plastics material 6, the colour of the material being selected having regard to the sensitivity range of the photoconductive material used on the copy sheets in a manner as will be described hereafter. The window 5 gives an observer seated outside the housing a clear view of an inclined screen 7 located at the far side of a generally pentagonally shaped viewing space 8. The material 6 of the window 5 and the screen 7 constitute two sides of this space 8, the remaining three sides serving as a reservoir 9 for copy sheets, a charging station 10 and a development station 11. Adjacent the reservoir 9 is a plane reflecting mirror 12 which reflects the image of the microfiche onto the screen 7.

When used as a reader, the observer views the selected microfiche through the window 5 and the coloured sheet of material 6, the image appearing on the screen 7 which is inclined at 45° to the horizontal, a convenient angle at which to view the image.

When the observer wishes to take a permanent copy of a particular image, he can lift a hinged top flap 13 on the upper surface of the housing 1, remove a copy sheet from the reservoir and insert this into an inlet slit 14 above the reservoir 9 until the leading edge of the sheet comes to rest against the nip of a pair of inlet rollers 15 and 16. One of these inlet rollers (15 in the drawing) terminates in a knob 17 exposed to one side of the housing and rotation of the knob will feed the copy sheet between the rollers 15 and 16 further into the charging station 10.

Just downstream of the inlet rollers 15 and 16 is a pivoted finger 18 which is displaced by the leading edge of the fed-in copy sheet, deflection of this finger from its normal rest position actuating a main drive motor 19 (shown schematically in FIG. 2) which powers the various components of the device in the manner hereinafter to be described. When the motor 19 is operating, the rollers 15 and 16 are powered therefrom so that further movement of the copy sheet through the device is effected automatically once the finger 18 has been deflected by the leading edge of the manually fed-in sheet.

Downstream of the finger 18 is a corona charging station 20 and downstream of that, a further pair of feed rollers 21 and 22.

The copy sheet is of zinc oxide coated paper and is fed into the slit 14 with its coated surface facing downwards so that it is the downward-facing surface leaving the corona unit 20 which is charged with the uniform electrostatic charge. Thus it is feed roller 21 which contacts the uniformly charged surface of the copy sheet and this roller is made of suitable electrically insulating material to prevent disturbance of the charged surface by its contact therewith. An arcuate deflector plate 23 downstream of the feed rollers 21 and 22 encourages the leading end of the fed sheet to turn downwardly and, as the feed rollers 21 and 22 advance the sheet, lower the charged sheet down past the inclined screen 7.

Figure 3:
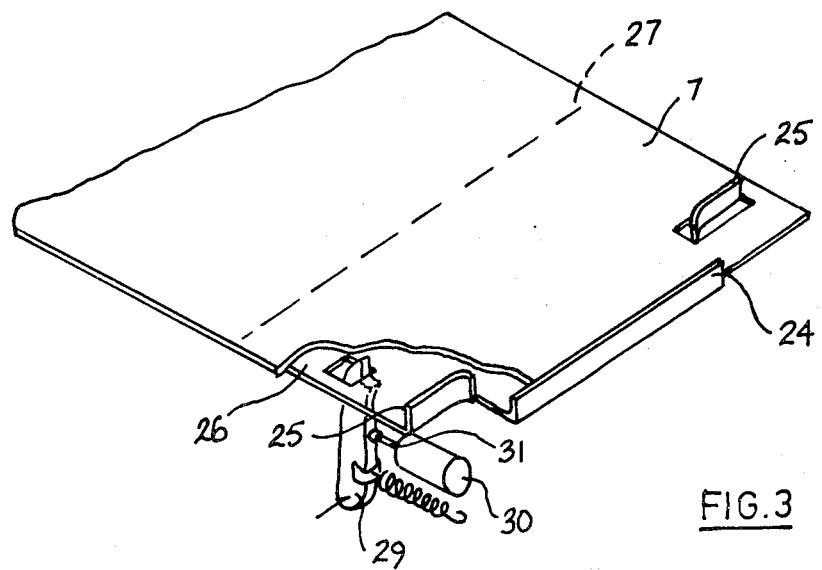
FIG. 3 is a schematic view of the exposure station of the device shown in FIG. 1 and FIG. 2.

Adjacent the bottom edge of the screen 7, two sets of stop means are provided, the lower of these being a first projecting edge 24 and the upper, a pair of bent-up edges 25. From FIG. 3 it can be seen that the edges 25 are spaced apart sufficiently to permit the leading edge of a copy sheet lowered over the screen 7 with its shorter end leading to pass between the edges 25 so that the leading end is brought to rest against the edge 24. If, however, the copy sheet had been fed into the slit 14 with the longer side of the sheet leading, it would be the outer edge portions of this longer side which engaged the spaced-apart edges 25 thus bringing the copy sheet to rest at a somewhat higher position on the screen 7 than in the case where it was the shorter end of the sheet which was the leading end.

The inner extremities of the spaced-apart edges 25 projecting through the screen 7 are curved downwardly to ensure that if a copy sheet, in its fall over the screen 7, moves slightly off line, the curved portions of the edges 25 will deflect it back between the edges 25 so that it comes to rest against the lower edge 24.

The edges 24 and 25 are formed on a flap member 26 which is hinged below the screen 7 on the line 27. A cam member 28, rotatable in the direction of the arrow A during operation of the motor 19, bears against the underside of the flap member 26 during an initial part of its rotation, pushing the latter up into contact with the underside of the screen 7 and thereby causing the edges 24 and 25 to project beyond the upper face of the screen 7. As the flap member 26 moves into this upper position, a pivoted finger 29 locks it into this upper position. Once the finger is locked in place, the flap member 26 is no longer held in its upper position by the cam member 28 so that when the cam surface retracts from the underside of the flap member it remains in the upper position held there by the finger 29. Release of the flap member 26 is effected by means of a solenoid 30 actuating a plunger 31, the plunger bearing against the finger 29. When electrical energy is supplied to the solenoid 30 at the appropriate moment in the processing cycle (as will hereinafter be described), the plunger 31 moves the finger 29 out of its recess in the flap member 26, releasing the latter and allowing it to fall back into the position illustrated in FIG. 2.

Figure 4:
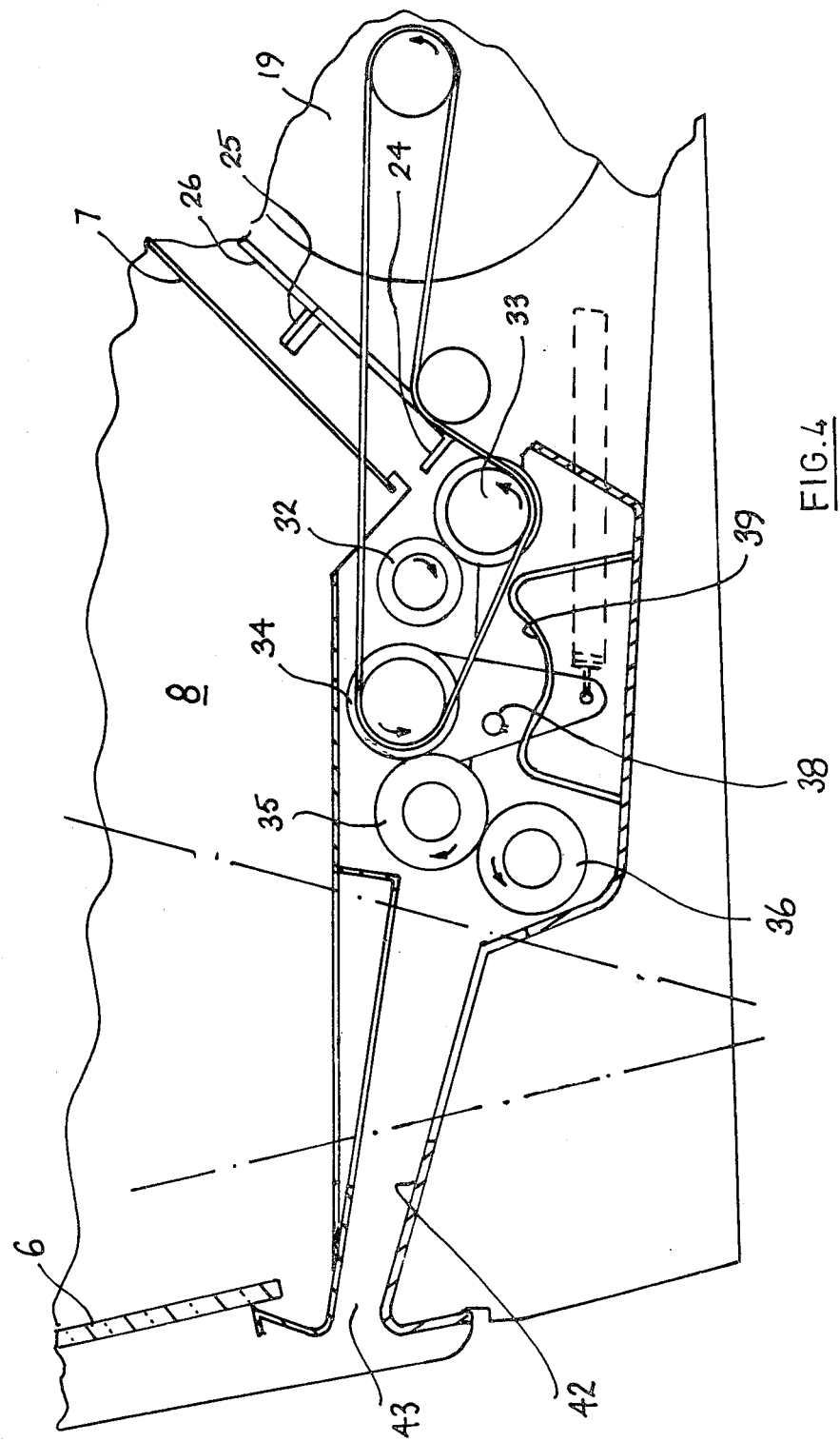
FIG. 4 is an enlarged view of the development station of the device of FIGS. 1 and 2.

Downstream of the screen 7 is the development station 11 and this comprises five rollers numbered 32-36. The path of the copy sheet through the development station is shown more clearly in FIG. 4, the sheet entering the station through the nip between rollers 32 and 33 and leaving the station through the nip between the squeegee rollers 35 and 36. Since roller 32 contacts the copy sheet on the side thereof that supports the charge image, it must be made of appropriate electrically insulating material. The upper squeegee roller 35 is pressed into contact with the lower squeegee roller 36 by a further roller 34. Between the nips of the roller pairs 32, 33 and 35, 36, the copy sheet is made to curve over the upper surface of a shallow trough 39 and below a liquid developer dispensing bar 38. The shallow trough 39 fills with a liquid developer from the bar 38 prior to the approach of the leading edge of a copy sheet. As the sheet passes through the development station the charge image on its upper surface is converted into an image of toner particles by virtue of that upper surface being contacted by developer issuing from the bar 38.

A reservoir for developer liquid is provided at 40 and a bottle 41 supplies fresh liquid developer to the reservoir as this is used up in the development process. A pump and ducting (not shown) are provided to circulate developer from the reservoir 40 to the dispensing bar 38, surplus developer draining back into the reservoir 40 when the pump is operating.

The printed copy sheet, after passing through the nip between the squeegee rollers 35 and 36, enters an outlet passage 42 which terminates in a slot 43 located below the window 5. It will be noted, therefore, that the optical path from the lens system 4 to the mirror 12 passes across the outlet passage 42 and appropriate apertures must be provided in the walls of this passage to permit the light beams to pass therethrough. Although no image can be projected onto the screen 7 when a copy sheet is passing through the outlet passage 42, this does not represent a disadvantage in practice, since a copy sheet is only in the outlet passage in the final stage of a print sequence.

Figure 5:
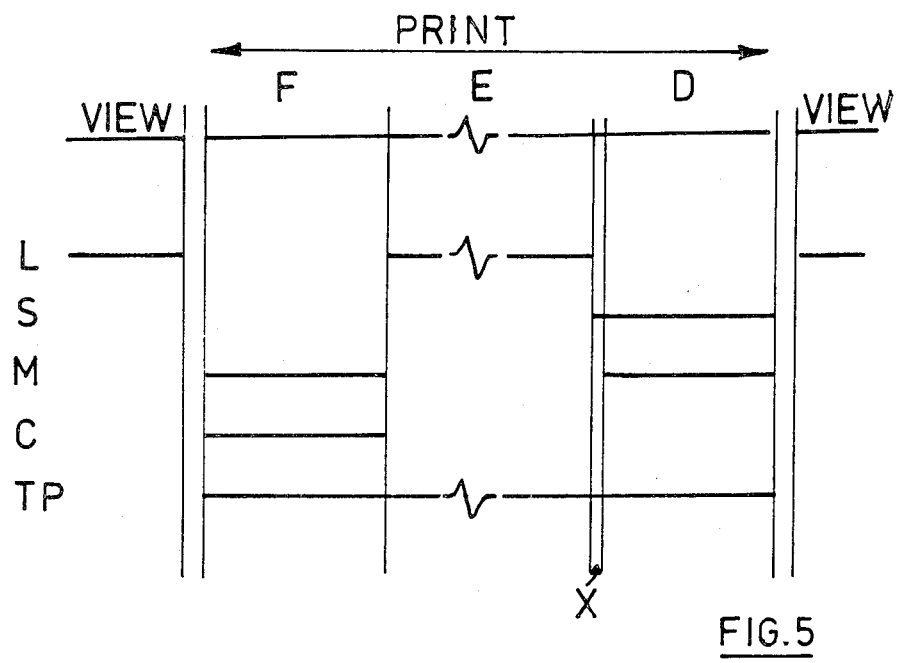
FIG. 5 is a sequencing diagram illustrating the manner in which the device of FIGS. 1 and 2 is operated in practice.

FIG. 5 shows the sequence employed during a print operation, the letters on the left-hand side of the sequence diagram representing the lamp (L), the solenoid 30 (S), the drive motor 19 (M), the corona unit 20 (C) and the toner pump (TP). The print cycle is divided into three sections, the first representing feed of copy material through the charging station 10 (F), the second, exposure of the charged copy material on the screen 7 (E) and finally, development of the copy sheet in the development station 11(D). The cam 28 controls the sequences in the F and D sections, in the course of a single 360° rotation.

The period of the print cycle allocated to exposure is variable (it depends upon the intensity of the image projected on the screen 7) and this variability has been indicated by the broken lines in that section of the diagram. It is significant to note that the short period indicated X, between stages E and D, represents a delay between operation of the solenoid (and thus withdrawal of the stop means which is holding the copy sheet away from the nip of the inlet pair of rollers 32 and 33) and the re-energisation of the motor 19, which results in rotation of the rollers 32 and 33. This short delay (which in practice need be no more than approximately one second) ensures that the leading edge of the copy sheet is stationary against the nip when the roller pair commences rotation, thus ensuring that the leading edge is normal to the direction of feed of the copy sheet through the development station.

Although the device illustrated employs manual feed of copy sheets from the reservoir 9 into the inlet slit 14, it will be appreciated that the disposition of this reservoir adjacent the upstream end of the charging station 10 makes it a simple matter to modify the design and incorporate automatic paper feed from the upstream end of the reservoir 9 into the downstream end of the charging station 10.

The provision of the coloured sheet material 6 in the window 5 means that it is not necessary to close off the window 5 during exposure of charged material resting on the screen 7. This is because it is possible to select the material 6 so that its transmission wavelength band corresponds to an insensitive region of the charged copy sheet. This is a significant advantage in practice, since it permits a much simpler design of device, there being no need to provide a movable shutter to block out ambient light from the viewing space 8.

The marks 44, adjacent to the slit 14, aid in centring the copy sheet in the slit when it is fed end first into the device. If desired, the edges 45 of the slit (which are dimensioned with regard to the width of a sheet fed side first into the slit 14) can be adjustable and can move in symmetrically about the centre line of the slit to ensure accurate feed of end first fed sheets.

Knob 44 controls the focus of the lens system 4 and knob 45, the length of the exposure in the print cycle. An on/off switch 46 is also provided.

Although the invention has been described with reference to a front projection type of reader-printer, it is possible to utilise the exposure station of the invention in any type of electrophotographic printer To ensure that the transverse centre line of a copy sheet rests at the same position irrespective of whether it is fed in end-first or side-first, the spacing between the rest positions of the leading edge of a copy sheet when resting respectively on the lower and the upper stop means, is substantially one half the difference between the length and the width of the size of copy sheet for which the printer has been designed to operate.

Feeding a sheet end-first will produce a copy in what is variously known as the "portrait", "source document" or "hoch" format and feeding a sheet side-first will produce a copy in what is known as the "landscape", "COM" or "quer" format. It is a useful facility to have automatic interchange between these formats which is dictated solely by the way the sheet is fed into the printer.

What is claimed is:

1. An exposure station in an electrophotographic printer comprising means defining a downwardly inclined support for a copy sheet and stop means for the sheet adjacent to the lower extremity of the support, which stop means is movable between operative and inoperative positions only in the former of which it supports a sheet against sliding down the support, characterised in that the stop means comprises a lower stop means and an upper stop means, the lower stop means being effective in a transverse central region of the support and the upper stop means being in two parts, one lying on each side of said central region.

2. An exposure station as claimed in claim 1, in which the support is plane screen of a front projection reader-printer which is inclined to the horizontal at an angle between 35° and 70°.

3. An exposure station as claimed in claim 1, in which the support is a plane plate provided with apertures for the stop means, the stop means being members projecting through those apertures from below in the operative, but not in the inoperative, position.

4. An exposure station as claimed in claim 3, in which the projecting members are bent-up edge regions of a second plate movably mounted below the support, which second plate is gravity-urged into its lower position and locked in its upper position by a spring-urged finger.

5. An exposure station as claimed in claim 1, in which the spacing between the rest positions of the leading edge of a copy sheet when resting respectively on the lower and the upper stop means, is substantially one half the difference between the length and the width of the size of copy sheet for which the reader-printer has been designed to operate.

6. An exposure station as claimed in claim 5, in which the two parts of the upper stop means are spaced apart by a distance which is slightly greater than the width of a copy sheet for which the reader-printer has been designed to operate.

7. An exposure station as claimed in claim 1, in which a pair of confronting rollers are provided below the lower stop means, the nip defined between this pair of rollers representing the inlet to a development station and the sequencing of the movement of the stop means between operative and inoperative positions and the commencement of rotation of the confronting rollers to feed a sheet through the development station, involves a delay sufficient to ensure that the copy sheet has become stationary against the nip with its leading edge accurately aligned with the nip.

* * * * *